United States Patent
Hall

(10) Patent No.: US 7,205,934 B2
(45) Date of Patent: Apr. 17, 2007

(54) TRANSMIT-RECEIVE MODULE FOR A RADAR

(75) Inventor: Charles David Hall, Portsmouth (GB)

(73) Assignee: Astrium Limited, Stevenage (GB)

( * ) Notice: Subject to any disclaimer, the term of this patent is extended or adjusted under 35 U.S.C. 154(b) by 0 days.

(21) Appl. No.: 10/478,110

(22) PCT Filed: May 15, 2002

(86) PCT No.: PCT/GB02/02287

§ 371 (c)(1),
(2), (4) Date: Nov. 19, 2003

(87) PCT Pub. No.: WO02/095964

PCT Pub. Date: Nov. 28, 2002

(65) Prior Publication Data

US 2004/0145515 A1    Jul. 29, 2004

(30) Foreign Application Priority Data

May 23, 2001  (GB) ................. 0112454.4

(51) Int. Cl.
*G01S 7/28* (2006.01)
(52) U.S. Cl. .................................. 342/175
(58) Field of Classification Search ......... 342/175, 342/165, 173, 174
See application file for complete search history.

(56) References Cited

U.S. PATENT DOCUMENTS

| | | | |
|---|---|---|---|
| 4,193,129 A | | 3/1980 | Wiggins et al. ............ 367/106 |
| 5,093,667 A | * | 3/1992 | Andricos .................... 342/372 |
| 5,491,482 A | | 2/1996 | Dingwall et al. ............. 342/42 |
| 5,590,419 A | * | 12/1996 | Shimo ..................... 455/127.2 |
| 5,628,054 A | * | 5/1997 | Osaka ........................ 455/573 |
| 5,870,063 A | * | 2/1999 | Cherrette et al. ........... 343/853 |
| 5,898,908 A | | 4/1999 | Griffin et al. ............ 455/127.2 |
| 5,914,542 A | | 6/1999 | Weimer et al. ............. 307/125 |
| 5,940,031 A | * | 8/1999 | Turlington et al. ......... 342/372 |
| 6,097,335 A | * | 8/2000 | Cassen et al. .............. 342/175 |
| 6,104,333 A | | 8/2000 | Wood, Jr. .................... 341/173 |
| 6,220,516 B1 | | 4/2001 | Tuttle et al. ................. 235/492 |
| 6,317,049 B1 | * | 11/2001 | Toubia et al. ............ 340/573.4 |
| 6,392,565 B1 | * | 5/2002 | Brown ........................ 340/988 |

(Continued)

FOREIGN PATENT DOCUMENTS

| JP | 000641089 A2 | * | 1/1995 |
|---|---|---|---|
| JP | 7-234273 | | 9/1995 |
| JP | 2004-852208 A | * | 3/2004 |

OTHER PUBLICATIONS

"Space power alternatives for laser radar sensor system", Boretz, J.F.;Aerospace and Electronic Systems Magazine, IEEE, vol. 5, Issue: 3 Mar., 1990 pp.:3-8.*

(Continued)

*Primary Examiner*—John B. Sotomayor
(74) *Attorney, Agent, or Firm*—Nixon & Vanderhye P.C.

(57) ABSTRACT

A transmit-receive module has a battery energy store with associated circuitry for generating power (RF power) over periods ranging, as desired, from periods as short as small fractions of one second to continuous emissions over prolonged periods. The arrangement bears a definite cost advantage over known arrangements and retains utility for various applications, radar and space-based applications for example.

18 Claims, 3 Drawing Sheets

U.S. PATENT DOCUMENTS

| | | | |
|---|---|---|---|
| 7,031,757 B2* | 4/2006 | Schwengler et al. | 455/572 |
| 2004/0050188 A1* | 3/2004 | Richards et al. | 73/866.3 |
| 2004/0101166 A1* | 5/2004 | Williams et al. | 382/104 |
| 2004/0145515 A1* | 7/2004 | Hall | 342/175 |
| 2004/0145520 A1* | 7/2004 | Richardson et al. | 342/357.07 |

OTHER PUBLICATIONS

"Broadband integrating Bragg cell receiver for electronic support measures", Gatenby, P.V.;Radar and Signal Processing [see also IEE Proceedings-Radar, Sonar and Navigation], IEE Proceedings F, vol: 136, Issue: 1, Feb. 1989 pp.:63-68.*

"Electrical Power Distribution on Space Based Radar Satellites", M. H. Moody et al, IEEE AES Magazaine, Nov. 1989, pp. 10-16.*

"High resolution (metric) SAR microsatellite based on the CNES MYRIADE bus", Aguttes, J.P.; Geoscience and Remote Sensing Symposium, 2001. IGARSS '01. IEEE 2001 International vol. 1, Jul. 9-13, 2001 pp.:224-226 vol. 1.*

I Nogradi, 28$^{th}$ Intersociety Energy Conversion Eng. Conf., 1993, "Array-Type Pulsed Power Modulators", vol. 1, pp. 291-294.

* cited by examiner

# TRANSMIT-RECEIVE MODULE FOR A RADAR

This application is the US national phase of international application PCT/GB02/02287 filed 15 May 2002, which designated the US. PCT/GB02/02287 claims priority to GB Application No. 0112454.4, filed 23 May 2001. The entire contents of these applications are incorporated herein by reference.

FIELD OF THE INVENTION

The present invention relates to a module and more particularly, but not exclusively, concerns a transmit-receive module (TRM) for use in radar communication for example.

BACKGROUND OF THE INVENTION

The use of transmit-receive modules (TRMS) has become a popular method of exciting the antennas associated with phased array radar instruments. The use of such modules enables RF power to be developed at a number of sites across the antenna. Typically this is a large number. The peak RF power required to provide the required level of radar instrument functionality can then be generated in small portions in each of the TRMs and united into a single pulse of RF power in the region of air/space in front of the antenna.

The provision of such RF power creates demands for energy within the TRM. This energy is conventionally acquired from short-term energy stores, typically from a bank of capacitors. However, the finite amount of energy that can be stored in such capacitors coupled with the rapid rate at which such energy is discharged of energy from them during the period when the TRM is required to produce a pulse of RF energy, imposes a significant constraint on the duration of pulse that can be generated by the TRM. The typical duration of such pulses is between microseconds and hundreds of microseconds.

The need for such capacitors introduces considerable complexity into TRM design for radars in which the transmitter is required to transmit continuously for periods longer than hundreds of microseconds. In particular, in cases where the radar is required to provide continuous rather than pulsed illumination of a region of interest, a different means of operating TRMs has to be used.

During pulsed operation, the mean current needed to replenish such capacitors after each pulse of RF power generation, leads to a need for significant DC power conditioning circuits within each TRM, and the need for wire conductors of appreciable cross-sectional area to convey electrical power to the power conditioning elements in each TRM. The power conditioning circuits in each TRM take electrical power from the external source, for instance—from the main electrical power bus that is made available to electrical equipments in most spacecraft/satellites, and converts that available power into the specific supply voltages that may be needed by individual electrical circuits within the TRM.

OBJECTS AND SUMMARY OF THE INVENTION

The present invention aims to overcome or at least substantially reduce some of the above-mentioned drawbacks.

It is an object of the present invention to provide a transmit-receive module (TRM) which generates power (RF power) over periods ranging as desired from periods as short as small fractions of one second to continuous emissions over very prolonged periods. This is an improvement over the capability of known TRM designs which are able only to operate over periods that are only small fractions of one second.

It is another object of the present invention to provide a transmit-receive module (TRM) which enables a cheap approach to the provision of TRM functionality for space-based applications where financial budgets are often constrained.

In broad terms, the present invention resides in the concept of using batteries as the energy storage medium in the TRM instead of capacitors so as to enable operation of the TRM at any pulse length up to and including continuous emissions.

Therefore, according to one aspect of the present invention, there is provided a transmit-receive module for energising an antenna, the module comprising: battery-energy storing means for providing a supply of energy to the module over a predetermined duration of time; and circuitry associated with the battery-energy storing means, the circuitry including (1) generating means for generating power in dependence upon the supply of energy from said battery-energy storing means and (2) transmitting means for transmitting the generated power to the antenna so that the antenna is energised by operation of the module.

Advantageously, the use of the TRM of the present invention obviates the need for the power conditioning circuits that are usually present in known TRM designs. Conveniently, in the invention, the cross-sectional area of the wires needed to convey electrical power to the module is reduced.

Advantageously, although power can be supplied to the module of the invention during operation, supply during operation is not essential. The power can typically be supplied to the module for a period of time before operation of the module commences so that all the energy needed for that period of operation is present when operation commences.

Conveniently, the selection of batteries as the energy storage medium in the TRM whose supply voltage is matched to that required by the principal energy sinks in the TRM, obviates the need for the more complex power conditioning circuitry associated with operation of a known TRM design from a generic power supply rail.

Further, the use of batteries as the energy storage medium in the present invention enables recharging of the overall required energy resource to take place during periods when the module is not being used as well as during its operation. Conveniently, the mean current drawn by the TRM of the invention is no greater than that drawn by conventional TRM designs that use capacitors for energy storage, and is often significantly smaller. Therefore, the cross section of conductors conveying power to the new kind of TRM of the proposed invention is smaller and the associated mass is smaller.

Preferably, the batteries are lithium ion devices of the kind from Sony/AEA Technology designated as types 18650.

Preferably, the condition of the batteries is monitored by a battery charge controller so that the batteries can be automatically recharged when there is an indication that the batteries require recharging/renewal.

In accordance with an exemplary embodiment of the invention which will be described hereinafter in detail, the circuitry of the module comprises a combination of amplifiers and switches enabling RF power to be output by the module in response to the supply of energy from the batteries.

According to another aspect of the invention there is provided a method of operating a transmit-receive module for energising an antenna, the method comprising: storing energy in a battery-energy store of the module; providing a supply of the stored energy to the module over a predetermined duration of time; generating power in the module in dependence upon the supply of energy from said battery-energy store; and transmitting the generated power to the antenna so that the antenna is energised by operation of the module.

It is to be appreciated that the module of the invention has a simplified design and can be implemented at reasonable cost and it has utility for various applications, for example for space-based applications.

The above and further features of the invention are set forth with particularity in the appended claims and will be described hereinafter with reference to the accompanying drawings.

DETAILED DESCRIPTION OF AN EXEMPLARY EMBODIMENT

Figure 1:
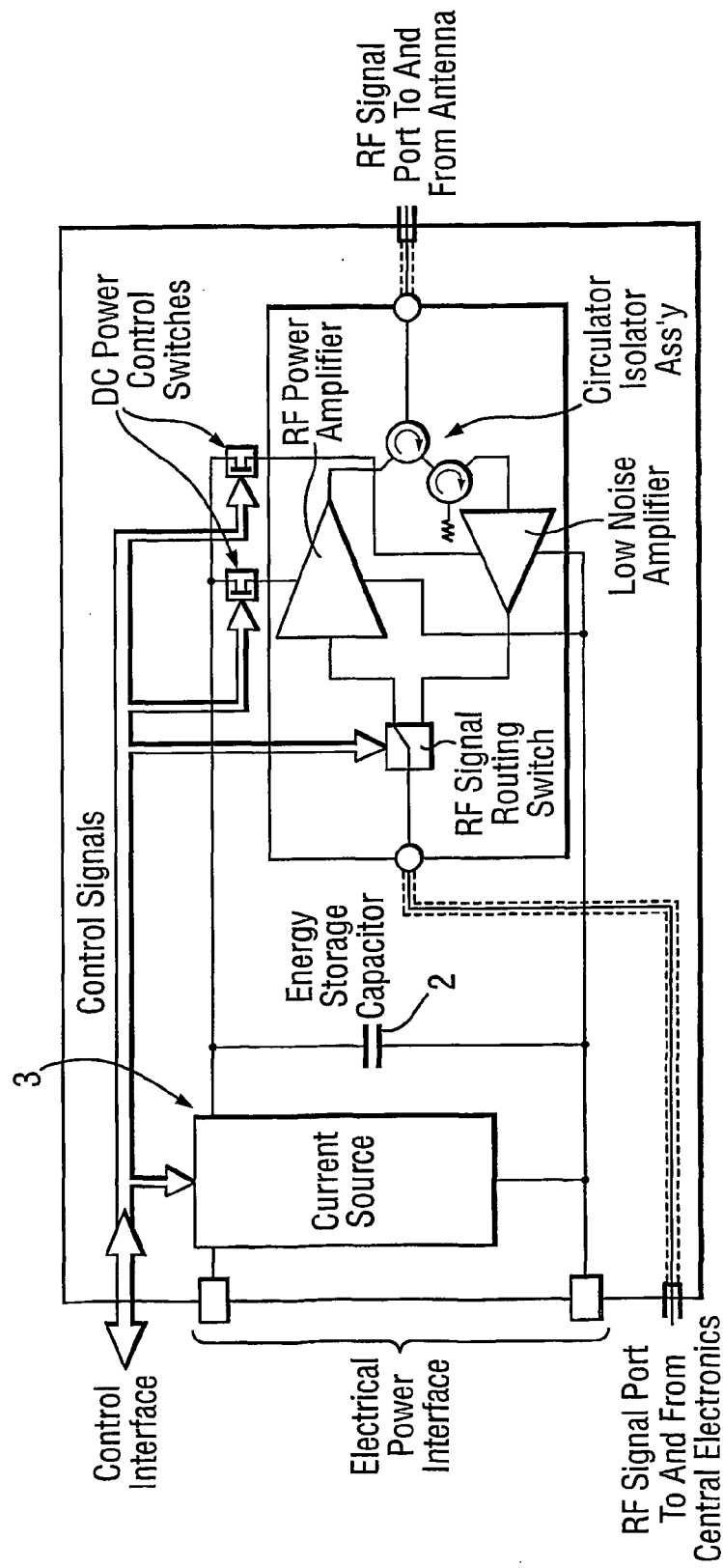
FIG. 1 is a schematic of the control and power interfaces in a known transmit-receive module design.

Referring to FIG. 1, there is schematically shown a conventional transmit-receive module (TRM) design 1 in which energy storage is available only for the short period corresponding to the duration of a typical radar pulse, typically in the range ten to hundreds of microseconds. As shown in the Figure, a capacitor 2 is used as the principal energy storage element, and associated with the capacitor 2, a current source circuit 3 comprising a current source is used to provide a steady charging current to the capacitor 2. This circuit 3 ensures that only a constant current drain is demanded from the external electrical power source (not shown), providing isolation from the severe pulse current demands made by the module 1 during transmit events.

Figure 2:
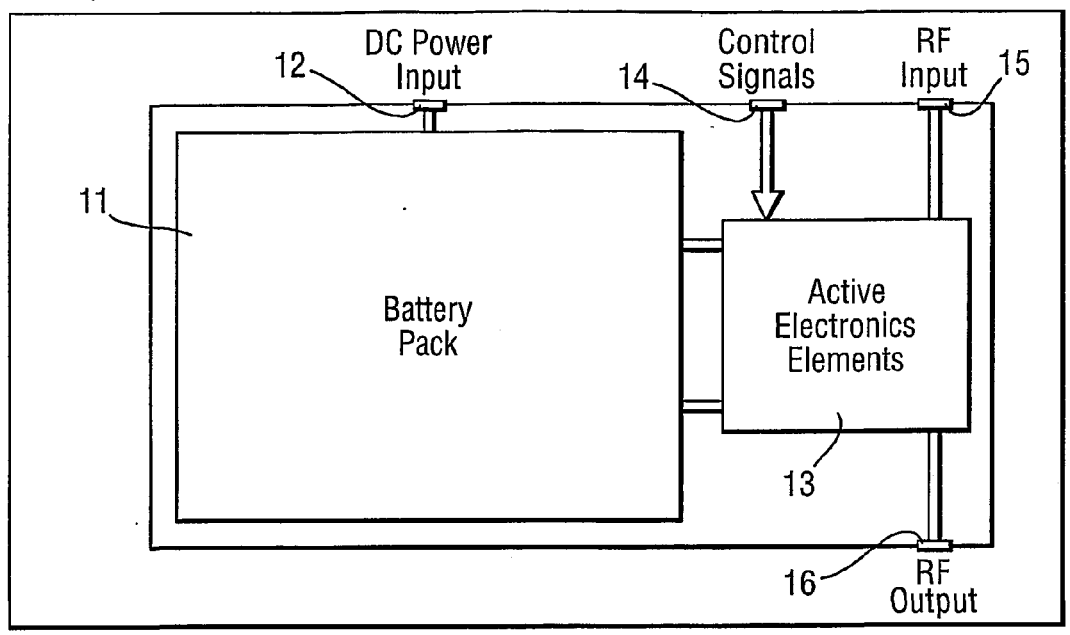
FIG. 2 is a schematic of a transmit-receive module embodying the present invention.

Referring next to FIG. 2, there is schematically shown the inter relationship between the principal elements of a preferred battery powered transmit-receive module (TRM) 10 embodying the present invention. The module 10 comprises an energy storage element in the form of a battery pack 11 having a DC power input 12 at its input end and associated electronics elements circuitry 13 for generating and transmitting power in response to the energy supplied by the battery pack 11 at its output end. As shown, the active electronics elements of the circuitry 13 have an RF input port 15 and RF output port 16 and control signals 14 are supplied to the circuitry 13 so as to controllably activate the components in the circuitry 13 when the module 10 is in operation.

Fundamentally, therefore, the battery pack stores energy that will be used by the battery; electrical power is routed to the battery to restore energy consumed during operation. While FIG. 2 shows DC power being routed to the module, the important aspect is the routing of the energy to the battery; that energy is conveniently supplied as DC electrical power. However, the energy could, for instance, be supplied as AC electrical power or as optical energy in the form of light which would subsequently be converted into electrical power through photovoltaic devices such as solar cells.

Note also that the "active electronic elements" conveniently provide the fundamental RF functionality of the TR module. These elements, by taking electrical power from the battery, and under the control of external signals, amplify incoming signals from the connection called RF Input and deliver the amplified version to the connection called RF output. Under further instruction from the port labelled "Control signals", these elements also are conveniently enabled to amplify incoming (low power echo) signals from the connection called RF Output and deliver amplified versions to the connection called RF Input.

Figure 3:
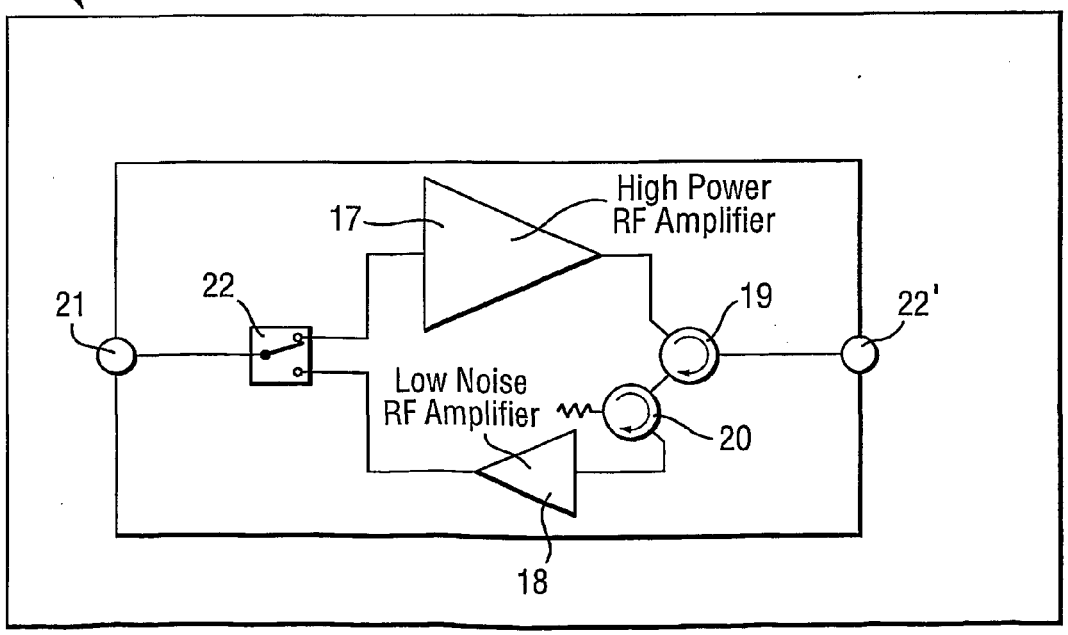
FIG. 3 is a diagram of the circuitry of the module of FIG. 2.

FIG. 3 shows the RF components of the circuitry 13 associated with the module 10 of the invention. As shown, RF signals are conveniently routed from the port called "RF input" 21 via a routing functionality, here presented as a switch 22 (although other devices such as ferrite circulators could provide similar functionalities), to an RF high power amplifier 17. Signals from the RF power amplifier 17 are then routed to the port called "RF output" 22' via a routing functionality, here presented as ferrite circulators (although other devices such as a switch could provide similar functionalities). During transmission events, elements of the "receive" chain are deactivated. After transmit events the RF power amplifier is deactivated and echo signals received at the TR module are taken through the routing functionality, shown in FIG. 3 as circulators 19, 20, to the radar-receiver amplifier functionality 18 where some amplification takes place. Amplified signals are then routed through the switch functionality 22 to the part called "RF input" 21.

Note also, as shown in the embodiment of FIG. 3, that a stable electronic coupling arrangement is advantageously provided to permit the high power RF amplifier 17 at its output to couple with the low noise RF amplifier 18 at its input via the circulator element 19 and the isolator element 20. The input of amplifier 17 and the output of amplifier 18 are connected to the signal routing switch 22. In use of the circuitry 13, the result is that voltage signals received from the battery energy store 11 of the module 10 by input port 21 (a low power RF port) are routed by means of the switch 22 to permit either (1) routing of the respective signals to a transmitter (not shown) via output port 22' (a high power RF port) or (2) routing of the output signals from the amplifier 18 to the port 21.

Figure 4:
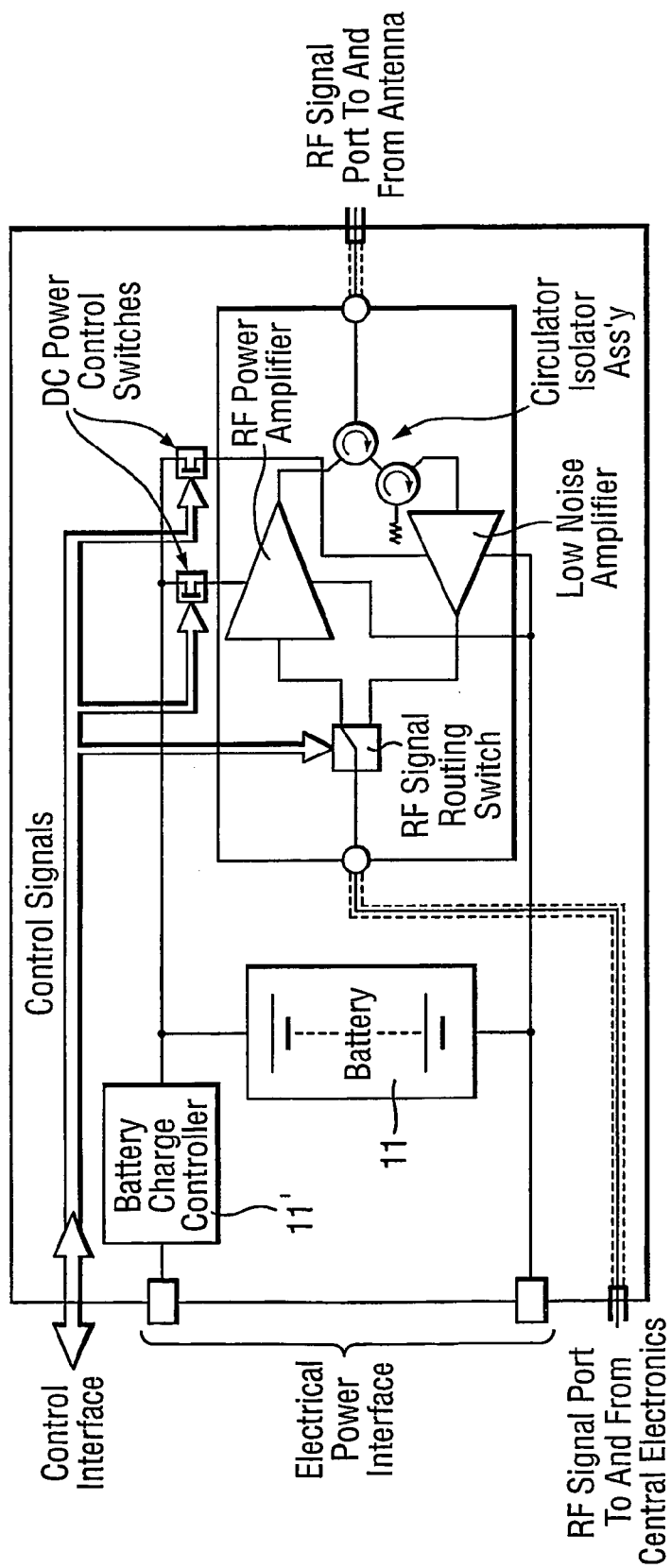
FIG. 4 is a schematic of the control and power interfaces in the module of FIG. 2.

Referring now to FIG. 4, this shows how the control and power interfaces described herein above are arranged in the module 10 of the invention. FIG. 4 also shows a functionality to influence the amount of charge delivered to the battery from the external power source. As shown, the circuitry of FIG. 4 relies upon the innovative proposition that batteries can be effectively used in place of capacitors as the principal energy storage medium of the module 10, the associated circuitry components (namely, the combination of switches and amplifiers), known in the art for generating and transmitting power, being suitably retained in the module 10. Signal adjustment is provided in the circuitry by means of the supply of predetermined control signals via the control interface. The illustrated circuitry is considered to be suitable for space-based applications for example.

While the selection of battery in the module of the invention is not restricted to any particular battery type or energy storage cell type from particular manufacturers, the module of the invention could be suitably realised using lithium ion devices from Sony/AFA Technology designated as type 18650.

A battery recharging facility can readily be provided and the circuitry of FIG. 4 shows one way of accomplishing this. As shown in the Figure, the battery 11 is connected to a battery charge controller 11' which monitors the condition of the battery 11 and controllably recharges the battery 11 when there is an indication that the battery 11 requires recharging.

Advantageously, the power generated by the module 10 in operation is in the form of pulsed power emission or continuous power emission. By varying the circuitry parameters, the module of the invention can operate at any pulse length up to and including continuous emission.

Further, the use of batteries in the module of the invention permits energy to be supplied to the circuitry by the batteries in a controlled way before or during the time of operation of the module.

It is to be noted that a number of modules 10 can be used together so as to combine together the respective powers generated by each of the modules, thereby providing a single intensified pulsed emission of power for transmission to an antenna for example.

Thus, in operation of the module(s) of the invention, the following steps are carried out:
(1) energy is initially stored in the battery of the module,
(2) the energy is released by the battery and is supplied to the associated circuitry over a predetermined duration of time,
(3) power is generated by the circuitry in dependence upon the energy supplied, and
(4) the generated power is transmitted to a remote site, for example to an antenna so that the antenna is energised by operation of the module.

Having thus described the present invention by reference to a preferred embodiment, it is to be appreciated that the embodiment is in all respect exemplary and that modifications and variations are possible without departure from the spirit and scope of the invention. For example, different types of battery or energy storage cell could be used and any number of batteries/cells could be used to realise the technical effect of the invention. Furthermore, whilst in the described embodiment the power is supplied to the module as DC electrical power, the power could alternatively be supplied as AC electrical power or as optical energy in the form of light which could subsequently be converted into electrical power through photovoltaic devices such as solar cells.

The invention finds utility for various applications, for example radar and space-based applications.

The invention claimed is:

1. An RF transmit-receive module for energising an antenna, the module comprising:
    battery-energy storing means for providing a supply of energy to the module over a predetermined duration of time; and
    circuitry associated with the battery-energy storing means, the circuitry including:
        generating means for generating RF power in dependence upon the supply of energy from said battery-energy storing means; and
        transmitting means for transmitting the generated RF power to the antenna so that the antenna is energised by operation of the module.

2. A module as claimed in claim 1, wherein the battery-energy storing means comprises a lithium ion battery device.

3. A module as claimed in claim 1, wherein the battery-energy storing means is connected at its output end to the circuitry via power control switching means.

4. A module as claimed in claim 1, further comprising battery control means for monitoring the condition of the battery-energy storing means, the control means being arranged to controllably recharge the battery-energy storing means when there is an indication that said battery-energy storing means requires recharging.

5. A module as claimed in claim 1, wherein the battery-energy storing means is connected at its input end to a DC power supply via an electrical power interface.

6. A module as claimed in claim 1, wherein the battery-energy storing means is selected such that the supply of energy of said battery-energy storing means matches the energy requirement of the module when in use.

7. A module as claimed in claim 1, wherein the circuitry is controllably activated by the supply of one or more pre-determined control signals via a control interface.

8. A module as claimed in claim 1, wherein the circuitry comprises a combination of amplifiers and switches enabling RF power, to be output by the module in response to the supply of energy of said battery-energy storing means.

9. A module as claimed in claim 1, wherein the circuitry is adapted and arranged to route signals to the antenna via a signal port and/or route signals between the respective circuit elements.

10. A module as claimed in claim 1, wherein the power generated by the module comprises a pulsed emission of RF power.

11. A module as claimed in claim 1, wherein the power generated by the module comprises a continuous emission of RF power.

12. A module as claimed in claim 1, wherein the supply of energy of the battery-energy storing means is provided to the module for a duration of time during the time of operation of the module.

13. A module as claimed in claim 1, wherein the supply of energy of the battery-energy storing means is provided to the module for a duration of time before the time of operation of the module.

14. A radar communications system comprising one or more modules as claimed in claim 1.

15. A spacecraft incorporating one or more modules as claimed in claim 1.

16. A satellite incorporating one or more modules as claimed in claim 1.

17. A combination of modules as claimed in claim 1 including means for combining the power generated by each of the modules to provide a single pulsed emission of power.

18. A method of operating an RF transmit-receive module for energising an antenna, the method comprising:
    storing energy in a battery-energy store of the module;
    providing a supply of the stored energy to the module over a predetermined duration of time;
    generating RF power in the module in dependence upon the supply of energy from said battery-energy store; and
    transmitting the generated RF power to the antenna so that the antenna is energised by operation of the module.

* * * * *